US005628382A

United States Patent [19]

Hill

[11] Patent Number: 5,628,382

[45] Date of Patent: May 13, 1997

[54] COLLAPSIBLE SAWHORSE

[76] Inventor: Dennis R. Hill, 40 E. Hyde Park Ave., St. Joseph, Mo. 64504

[21] Appl. No.: 536,976

[22] Filed: Sep. 29, 1995

[51] Int. Cl.$^{6}$ .......... F16M 11/00

[52] U.S. Cl. .......... 182/153; 182/185; 182/186

[58] Field of Search .......... 182/181–186, 182/153, 224–227

[56] References Cited

U.S. PATENT DOCUMENTS

| | | | |
|---|---|---|---|
| 638,987 | 12/1899 | Porten . | |
| 978,403 | 12/1910 | Schott . | |
| 1,226,112 | 5/1917 | Pepin et al. . | |
| 1,672,502 | 6/1928 | Roth . | |
| 1,742,637 | 11/1930 | Dearborn . | |
| 1,819,252 | 8/1931 | Linsner | 182/153 |
| 2,825,606 | 3/1958 | Rebensdorf . | |
| 3,289,789 | 12/1966 | Larson | 182/186 X |
| 3,529,697 | 9/1970 | Kossian et al. . | |
| 4,790,411 | 12/1988 | Ottoson . | |

*Primary Examiner*—Alvin C. Chin-Shue

*Attorney, Agent, or Firm*—Shook, Hardy & Bacon L.L.P.

[57] ABSTRACT

A collapsible sawhorse is provided. The sawhorse includes a plurality of brackets, each bracket including a pair of bracket members and each member having a jaw region and a base region. A pair of crossbars are transversely mounted between the jaw regions of the brackets such that the crossbars are supported by the brackets in generally parallel position. At least one leg is mounted to each base region for supporting the brackets above a surface. The bracket members are each pivotally interconnected for movement between a deployed position, wherein the crossbars are held in relatively close spatial proximity and the legs are relatively spaced apart, and a collapsed position wherein the legs are held in relatively close spatial proximity and the crossbars are relatively spaced apart.

5 Claims, 1 Drawing Sheet

Fig.1.
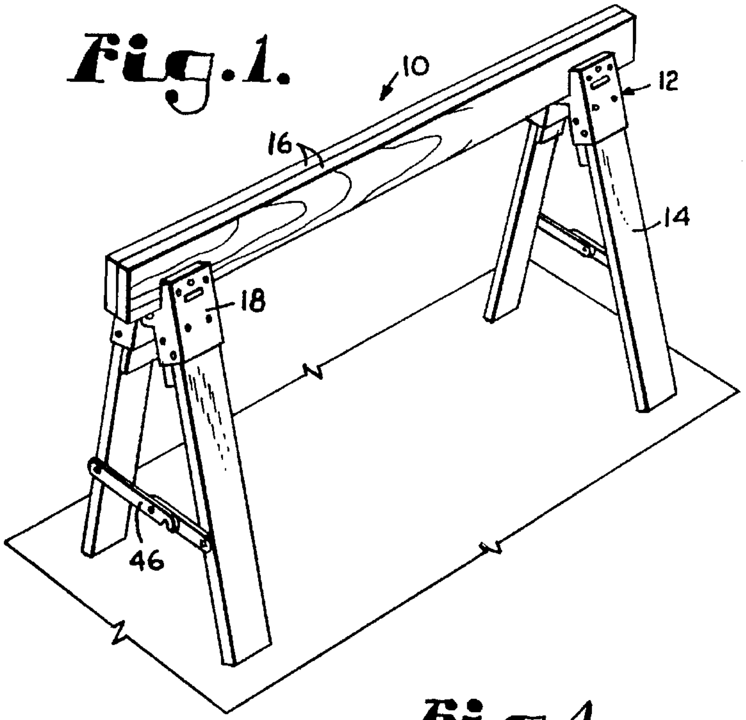
Fig.2.
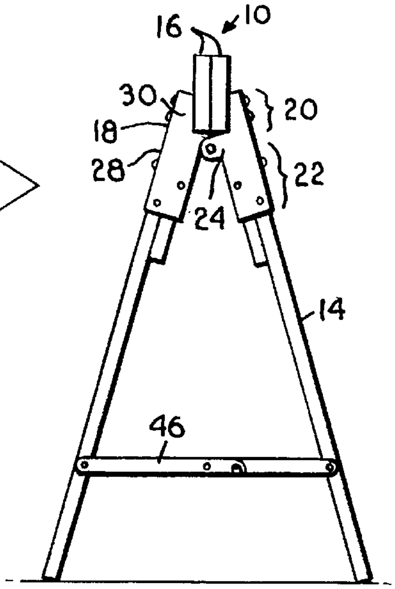
Fig.3.
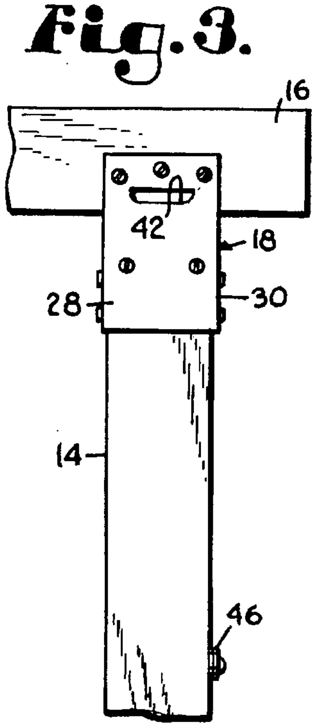
Fig.4.
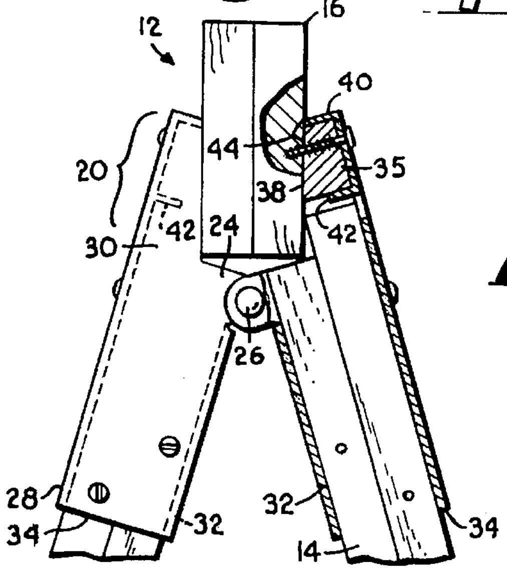
Fig.5.
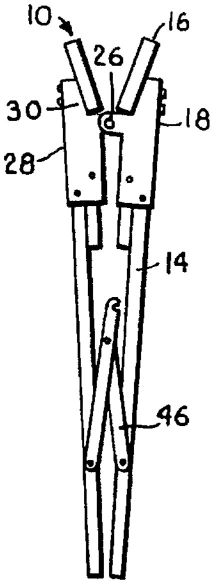
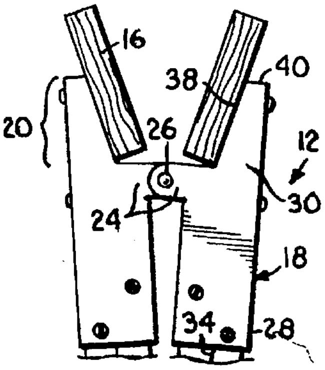
Fig.6.

COLLAPSIBLE SAWHORSE

BACKGROUND OF THE INVENTION

This invention relates to construction equipment and, more particularly, to a collapsible sawhorse.

Sawhorses are well known construction accessories that are used to support materials above a work surface. Sawhorses are generally used in pairs and typically include a horizontal crossbar supported by legs. A piece of material, such as a plank, may be transversely supported across the crossbars.

Sawhorses are employed in a wide range of construction applications. They are often used in measuring and cutting long pieces of material that could not otherwise be easily handled. Sawhorses are used by both industrial users and nonprofessional individuals who need to perform certain measuring and cutting tasks around the home.

One of the primary problems inherent with sawhorses is their bulky construction. Sawhorses are typically two to four feet high and from three to eight feet wide. The legs of the sawhorse span downwardly and outwardly from the crossbar. The substantial size and bulky construction of a sawhorse makes it very difficult to move and store. Its cumbersome nature is perhaps most problematic with contractors and other laborers who must transport the sawhorses with them to a construction site.

Sawhorses are also typically heavy. In many applications, sawhorses must support substantial weight for prolonged periods of time, thereby necessitating a sturdy construction. The sturdy construction of a sawhorse is typically achieved with standard 2"×4" studs. Such studs are readily available in the construction industry and work suitably well for supporting heavy weight. Unfortunately, 2"×4" studs are relatively thick and, consequently, weigh a great deal.

Another drawback of conventional sawhorses is that different applications call for sawhorses of different sizes. For example, in one application where common planks are to be measured and cut, relatively narrow sawhorses may be employed. The narrow sawhorses are naturally easier to move and lighter to carry and are, therefore, preferable. However, a second application may involve the measuring and cutting of a sheet of plywood or sheetrock which would require a much wider sawhorse. The narrow sawhorse utilized to measure and cut planks in the first application would be unworkable for the second application. Because of this, many professional users maintain two or more sets of sawhorses for use in different applications. This adds greatly to the storage and weight problems discussed above.

It is, therefore, the object of the present invention to provide a sawhorse that overcomes the problems associated with conventional sawhorses while providing a sturdy and inexpensive support for use in a broad range of construction applications.

More specifically, it is an object of the present invention to provide a sawhorse that is collapsible to a relatively small size, and which may be moved and stored easily.

It is another object of the present invention to provide a sawhorse utilizing inexpensive and lightweight materials, such as common 1"×4" boards, to reduce the cost and weight associated with conventional sawhorses.

It is yet another object of the present invention to provide a sawhorse utilizing a pair of removable crossbars that can be replaced with crossbars of varying lengths to allow a single sawhorse assembly to be used in a wide variety of applications.

SUMMARY OF THE INVENTION

To accomplish the foregoing and other related objects, the present invention relates to a collapsible sawhorse. In the preferred embodiment, the sawhorse of the present invention comprises a plurality of brackets, each bracket including a pair of bracket members and each member having a jaw region and a base region. The bracket members are interconnected between the respective jaw and base regions for pivotal movement between a deployed position, wherein the jaw regions are held in relatively close spatial proximity and the base regions are relatively spaced apart, and a collapsed position, wherein the base regions are held in relatively close spatial proximity and the jaw regions are relatively spaced apart. At least one leg is mounted to each base region of each bracket member for supporting the brackets above a work surface. A pair of crossbars are transversely mounted between the jaw regions of the brackets such that the crossbars are supported by the brackets in generally parallel position and whereby, when the brackets are in the deployed position, the crossbars are held in close spatial proximity, and when brackets are in the collapsed position, the crossbars are spaced apart from each another.

BRIEF DESCRIPTION OF THE DRAWINGS

The accompanying drawings form part of and are to be read in conjunction with the specification. Numbers have been used in the drawings to indicate features and parts of the various views that are discussed in the specification. The use in the drawings are as follows:

FIG. 1 is a perspective view of the collapsible sawhorse of the present invention;

FIG. 2 is an end elevational view of the collapsible sawhorse of FIG. 1;

FIG. 3 is an enlarged fragmentary, side elevational view of one bracket of the sawhorse shown in FIG. 1, and illustrating a leg extending vertically downward from the bracket and a crossbar disposed transversely through the jaw region of the bracket;

FIG. 4 is an enlarged fragmentary end elevational view of a bracket of the sawhorse of the present invention, the bracket being in the deployed position and pressing two crossbars together, parts being broken away to illustrate details of construction;

FIG. 5 illustrates the collapsible sawhorse of FIG. 2 but shows the sawhorse in collapsed position having the legs in close spatial proximity and the crossbars being relatively spaced apart; and FIG. 6 illustrates the bracket of FIG. 4, but shows the bracket in collapsed position with the crossbars being spaced apart.

DESCRIPTION OF THE PREFERRED EMBODIMENT

Turning now to the drawings in greater detail, the collapsible sawhorse of the present invention is broadly designated by the numeral 10. Sawhorse 10 generally comprises a pair of brackets 12, each bracket 12 being supported by a pair of legs 14, and a pair of crossbars 16 transversely mounted between the brackets 12.

As best seen in FIGS. 4 and 6, each bracket 12 comprises a pair of pivotally interconnected bracket members 18. Each member 18 includes a jaw region 20 and a base region 22. A pair of ears 24 are mounted laterally on each member 18 intermediate its respective jaw and base regions and project inwardly toward similarly disposed ears 24 on the other member 18. The corresponding ears 24 of the members 18 are interconnected by slip rivets 26, or other equivalent means, to allow relative pivotal movement of the members 18 between a deployed position, wherein the jaw regions 20 are held in relatively close spatial proximity and the base regions 22 are relatively spaced apart, and a collapsed position, wherein the base regions 22 are held in relatively close spatial proximity and the jaw regions 20 are relatively spaced apart.

Each member 18 includes a generally flat rear surface 28 and generally flat sides 30, the sides 30 being parallel to each other. At the base region 22 of each member 18, the forward edges of sides 30 are turned toward each other to form flanges 32. The flanges 32 are substantially parallel to the rear surface 28 and do not meet. The base region 22 of each member 18 is hollow with an open bottom end 34.

At the jaw region 20 of each member 18, the sides 30 taper upwardly in width so that the portion of the each side 30 proximal the ear 24 is significantly wider than the portion of the side 18 distal the ear 24. A substantially solid shim 35 is mounted within jaw region 20 to present a generally flat front surface 38 substantially coextensive with tapering sides 30 and a flat upper surface 40. The degree of taper of sides 30 causes front surface 38 to be similarly angled. The angled sides 30 and opposed front surfaces 38 of the bracket 12 position the surfaces 38 in vertical and parallel disposition when the bracket 12 is in the deployed position. A stop 42 is disposed at the lower end of the jaw region 20. Stop 42 preferably comprises a portion of the rear surface 28 bent inwardly in a plane substantially perpendicular to the plane of rear surface 28. A plurality of teeth 44 are disposed at the front surface 38 of the jaw region 20 of each member 18. In the preferred embodiment, teeth 44 are triangularly-shaped extensions of sides 30.

The brackets 12 of the present invention may be constructed of any rigid material, but are preferably constructed of sheet metal to allow convenient one-piece construction.

The legs 14 of the sawhorse 10 are preferably conventional 1"×4" planks. As best illustrated in FIG. 4, two such planks are received through the open bottom 34 of each base region 22 at least one abutting stop 42. In this disposition, the legs 14 are secured on four sides by rear surface 28, sides 30 and flanges 32. The legs 14 may be held in position by screws driven through the rear surface 28 and sides 30 of the members 18. In the preferred embodiment, as shown in the drawings, the base region 22 of each bracket 12 is configured to receive two 1"×4" planks in stacked disposition, one extending to the work surface and the other projecting only minimally below bracket 12. It is to be understood, however, that the sawhorse 10 could function suitably with only a single 1"×4" or 2"×4" plank extending from each base region 22.

The legs 14 of each bracket 12 are interconnected by a locking hinge 46. The hinge 46 is mounted between legs 14 and locks in position when the brackets 12 are in the deployed position to prevent further outward movement of the legs 14, as in FIG. 2. When the bracket 12 is moved to the collapsed position, as in FIG. 5, the hinge 46 flexes upwardly to allow the legs 14 to move inwardly.

The crossbars 16 of the present sawhorse 10 are two conventional 1"×4" planks of substantially equal length. The crossbars 16 are transversely mounted between a pair of brackets 12 such that one crossbar 16 is secured to one corresponding set of jaw regions 20 and the other crossbar 16 is secured to the other corresponding set of jaw regions 20. Each crossbar 16 is mounted independently of the other for movement with its respective jaw regions 20.

As best illustrated in FIG. 4, the manner of coupling of the crossbar 16 to the jaw region 20 is three-fold: First, the teeth 44 of the jaw region 20 embed into the crossbar 16 to inhibit movement in both the vertical and horizontal planes. Second, a screw is driven through the rear surface 28 of the member 18 into the crossbar 16 to releasably lock the crossbar 16 in place. Third, when in deployed position, the hinge 46 exerts biasing force against each leg 14 which, in turn, exerts inwardly pressing force at the jaw regions 20, which forces the front surfaces 38 against the crossbars 16 to prevent the outward release of crossbar 16 from the jaw regions 20. This triple-action coupling firmly secures the crossbars 16 to their respective jaw regions 20 while also allowing the quick and convenient interchange of crossbars 16 if circumstances require.

For best results, the brackets 12 are configured so that the crossbars 16 physically abut one another in parallel disposition in a vertical plane when in the deployed position. This disposition greatly increases the strength of the sawhorse and improves the crossbars' resistance to breakage since forces applied to one crossbar are also applied to the other crossbar when an object is supported on the sawhorse. The hinges 46 function to enhance this disposition by pressing the crossbars 16 tightly together when the hinge 46 is locked. Thus, the brackets 12 and the hinge 46 function in concert to maintain the crossbars in the preferred disposition, thereby allowing the sawhorse 10 to achieve its greatest strength and stability.

The collapsible nature of sawhorse 10 allows it to be stored in a very small area. The storage space of sawhorse 10 can be reduced even further by dismantling the crossbar 16 from the brackets 12. This would allow several bracket assemblies and crossbars 16 to be stored in a stacked arrangement requiring the width of only a single plank.

The sawhorse 10 is also extremely lightweight. Because the crossbars 16 and legs 14 are constructed of 1"×4" planks, sawhorse 10 is significantly lighter than conventional sawhorses constructed of 2"×4" studs. The sawhorse 10 is, therefore, easy to transport to the job site and between various locations on the job site.

In addition, the sawhorse 10 of the present invention may be collapsed and deployed quickly. The crossbars 16 and legs 14 are mounted to the brackets 12 and, thus, there is no disassembly required to collapse or deploy the sawhorse. Because the sawhorse 10 is easy to use, a laborer would be more inclined to use the sawhorse 10 when it is needed without concern for its complexity of operation. This would increase work efficiency and productivity.

Finally, because the crossbars 16 are removable and interchangeable, crossbars 16 of varying lengths can be employed without constructing a new sawhorse for each job. The range of applications afforded by the present sawhorse 10 would allow the laborer to maintain only four brackets 12 and an assortment of crossbars 16 and legs 14 of varying lengths. This greatly adds to the versatility of the invention.

From the foregoing, it will be seen that this invention is one well adapted to attain all of the objectives set forth above together with other advantages which are obvious and which are inherent to the invention.

It will be understood that certain features and subcombinations are of utility and may be employed without reference to other features and subcombinations. This is contemplated by and has been within the scope of the claims.

Because many possible embodiments may be made of the present invention without departing from its scope, it is to be understood that all matters set forth herein and shown in the accompanying drawings are to be interpreted as illustrative only and not in a limiting sense.

The following is claimed:

1. A collapsible sawhorse comprising:

a plurality of brackets, each bracket comprising a pair of bracket members and each member having a jaw region and a base region, the members being interconnected between their respective jaw regions and base regions for pivotal movement between a deployed position, wherein the jaw regions are held in close spatial proximity and the base regions are relatively spaced apart, and a collapsed position, wherein the base regions are held in relatively close spatial proximity and the jaw regions are relatively spaced apart;

a plurality of legs, at least one leg being mounted to each base region of each bracket member for supporting the brackets above a surface;

locking means coupled with the legs for maintaining the legs in position when the bracket members are in the deployed position, said means being moveable contemporaneously with the legs when the bracket members are moved between the deployed position and the collapsed position: and a pair of crossbars, each crossbar being constructed of a conventional 1 inch wooden plank rigidly mounted only to the front surface of a jaw region of each bracket member so as to be completely independent of the other crossbar and supported by a respective bracket in generally parallel disposition to the other crossbar and whereby, when the brackets are in the deployed position, the crossbars firmly abut one another so that forces applied to one crossbar are also applied to the other crossbar when an object is supported on the sawhorse, and when the brackets are in the collapsed position, the crossbars move away from one another and are each independently supported by said brackets, there being no direct connection between said crossbars.

2. The collapsible sawhorse of claim 1, wherein the jaw regions of the bracket members include opposed generally planar front surfaces.

3. The collapsible sawhorse of claim 1, wherein the crossbars and the legs are constructed of conventional 1×4 inch planks.

4. The collapsible sawhorse of claim 3, wherein two brackets are employed.

5. The collapsible sawhorse of claim 1, wherein each base region of the bracket members is adapted to accept a single leg constructed from a conventional wooden plank having a thickness between 1 inch and 2 inches.

* * * * *